(12) United States Patent
Bridon et al.

(10) Patent No.: US 11,880,920 B2
(45) Date of Patent: Jan. 23, 2024

(54) PERSPECTIVE CORRECT VECTOR GRAPHICS WITH FOVEATED RENDERING

(71) Applicant: Apple Inc., Cupertino, CA (US)

(72) Inventors: Jeremy G. Bridon, Mountain View, CA (US); Yidi Zhu, Mountain View, CA (US); Courtland M. Idstrom, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/968,933

(22) Filed: Oct. 19, 2022

(65) Prior Publication Data

US 2023/0186538 A1   Jun. 15, 2023

Related U.S. Application Data

(63) Continuation of application No. 17/744,320, filed on May 13, 2022.

(60) Provisional application No. 63/190,918, filed on May 20, 2021.

(51) Int. Cl.
G06T 11/60 (2006.01)
G06F 3/01 (2006.01)
G06T 11/40 (2006.01)

(52) U.S. Cl.
CPC .............. *G06T 11/60* (2013.01); *G06F 3/013* (2013.01); *G06T 11/40* (2013.01)

(58) Field of Classification Search
CPC ....................................................... G06T 11/60
See application file for complete search history.

(56) References Cited

U.S. PATENT DOCUMENTS

2017/0372457 A1*  12/2017  Sylvan ............... G06F 3/011
2021/0278678 A1*   9/2021  Brannan ........... G02B 27/0093

* cited by examiner

Primary Examiner — Shivang I Patel
(74) Attorney, Agent, or Firm — Thompson Hine LLP

(57) ABSTRACT

Various implementations disclosed herein include devices, systems, and methods that implement rendering processes that performs vector graphic rendering based on information received from a source application. Various implementations disclosed herein include devices, systems, and methods that implement foveated rendering using content received from a source by selectively drawing the content for only some regions based on gaze.

20 Claims, 12 Drawing Sheets

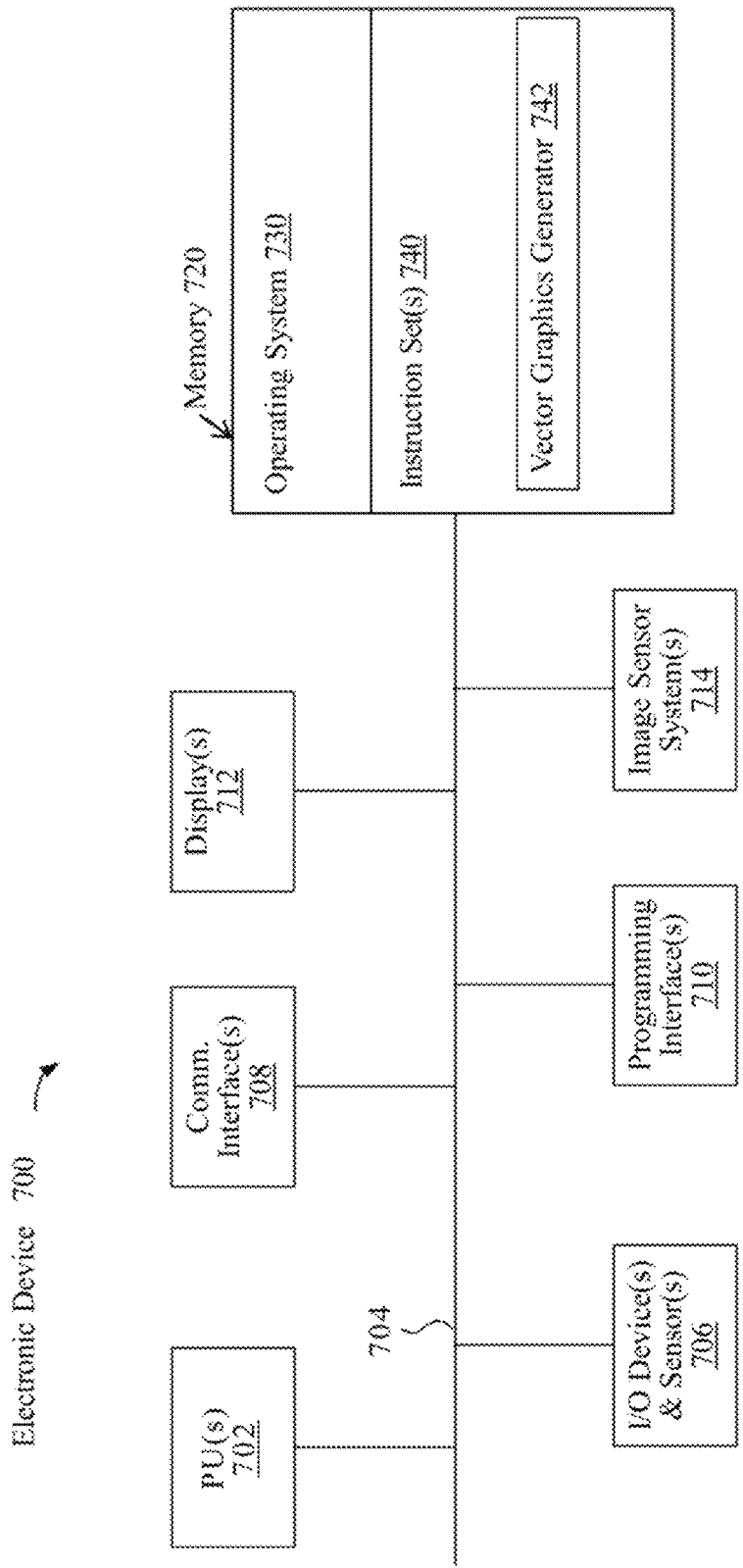

PERSPECTIVE CORRECT VECTOR GRAPHICS WITH FOVEATED RENDERING

CROSS-REFERENCE TO RELATED APPLICATIONS

This Application is a continuation of U.S. patent application Ser. No. 17/744,320 filed May 13, 2022, which claims the benefit of U.S. Provisional Application Ser. No. 63/190,918 filed May 20, 2021, each of which is incorporated herein by reference in its entirety.

TECHNICAL FIELD

The present disclosure generally relates to electronic devices that render vector graphics and, in particular, to systems, methods, and devices that provide foveated rendering for perspective correct vector graphics.

BACKGROUND

Existing rendering techniques may use an undesirable amount of an electronic device's resources (e.g., CPU and/or GPU computations, time, power, etc.). Existing rendering techniques may not accurately or efficiently depict complex vector graphics (e.g., text). Further, existing rendering techniques may not provide perspective correct graphics for content imported or otherwise provided from existing applications and/or different environments. For example, 2D content may not be displayed with accurate perspective when imported into and thus viewed within a rendered 3D environment.

SUMMARY

Various implementations disclosed herein include devices, systems, and methods the perform a rendering process that performs foveated text rendering using content received from a source (e.g., a mobile device app). For example, the content that would be displayed by an app on the screen of a mobile device may be displayed using a flat virtual surface at a position within a 3D environment. Rather than receiving a bitmap from the source (e.g., the mobile device app), the rendering process uses vector drawing commands that define the content from the source to render the content. Moreover, such vector drawing commands may be used to provide foveated rendering of the content from the source. In some implementations, the source is an application that provides content using API calls to API procedures of a drawing engine. The rendering process can be configured to render such content from a source without requiring that the source (e.g., mobile device app) be changed, for example, by instead changing the drawing engine API procedures. The rendering process can provide foveated rendering by drawing regions based on gaze direction (e.g., drawing only some regions, drawing some regions at higher resolution/higher frame rate, etc.). In some implementations, the rendering process provides an increase in quality in a focus region, compatibility with applications executing on existing electronic devices such as smart phones, tablets, or watches, the perception of perspective correct vector graphics and animation, and/or reduces the amount of computation and memory used in providing perspective correct rendering.

In general, one innovative aspect of the subject matter described in this specification can be embodied in methods that include the actions of obtaining vector graphic drawing commands corresponding to content generated by a source for display in a first display environment, wherein the source provides the first drawing commands to a drawing engine configured to display the content in the first display environment by generating a raster graphic using the first drawing commands, wherein the vector graphic drawing commands are obtained from the drawing engine based on the first drawing commands. In some implementations, a gaze direction of a user of an electronic device having a second display environment different than the first display environment is identified. Then, a first region and second region of a display space corresponding to a display of the electronic device is identified. In some implementations, rendering modes are determined for rendering the content in the first region and the second region based on the gaze direction, and the content is rendered on the display based on the vector graphic drawing commands and the rendering modes for rendering the content in the first region and second region.

In general, one innovative aspect of the subject matter described in this specification can be embodied in methods that include the actions of obtaining vector graphic drawing commands corresponding to content generated by a source for display in a first display environment. In some implementations, a gaze direction of a user of an electronic device is identifies, and a first region and second region of a display space corresponding to a display of the electronic device is identified. Then, rendering modes are determined for rendering the content in the first region and the second region based on the gaze direction, wherein, based on the first region having a first rendering mode and the second region having a second rendering mode, the content is only rendered in the first region. Then, the content is rendered on the display based on the vector graphic drawing commands and the rendering modes for rendering the content in the first region and second region.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 7 illustrates an exemplary electronic device in accordance with some implementations.

Figure 1:
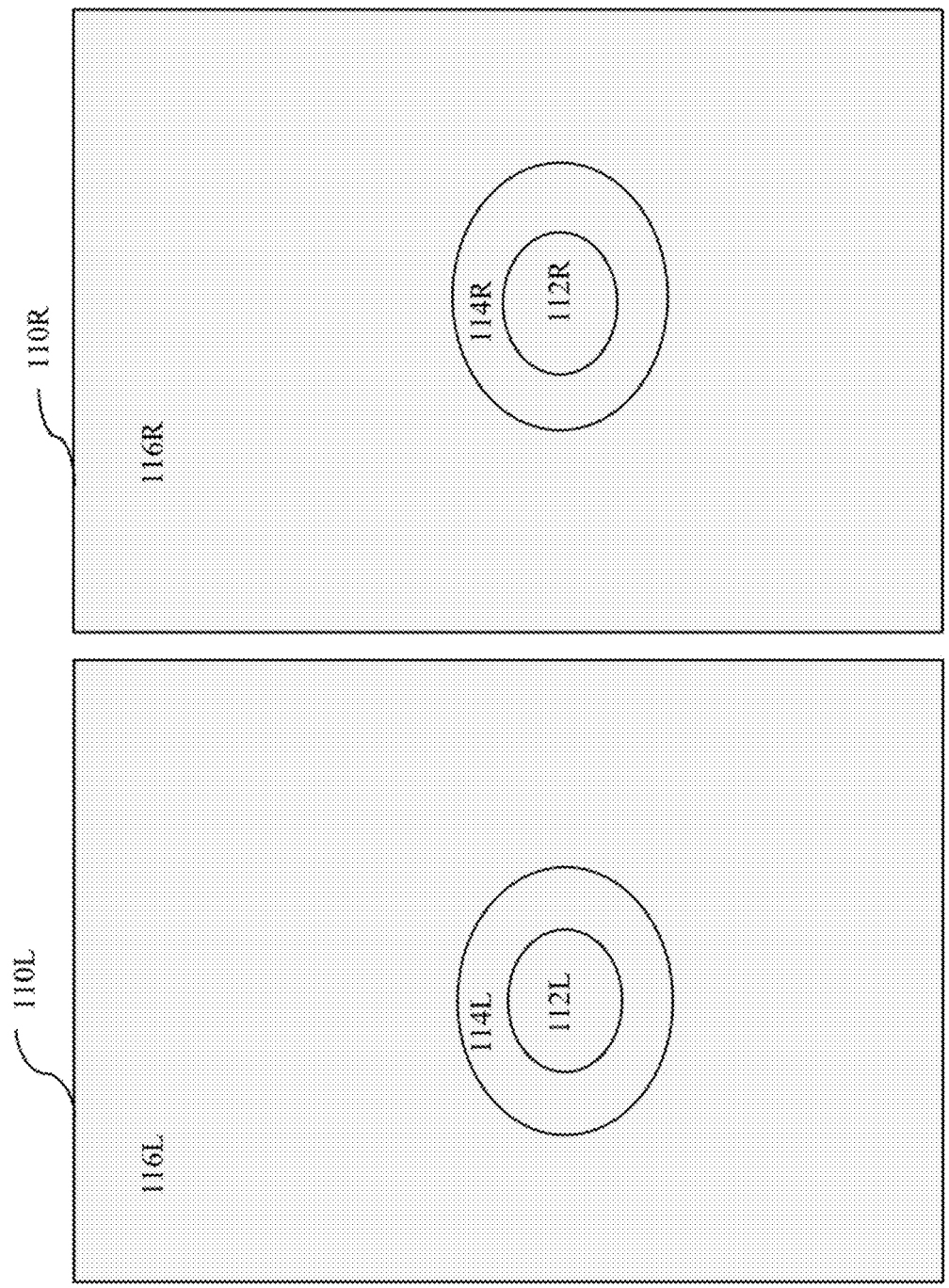
FIG. 1 illustrates left eye and right eye stereoscopic images provided by an electronic device in providing an extended reality (XR) environment in accordance with some implementations.

In accordance with common practice, the various features illustrated in the drawings may not be drawn to scale.

Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

FIG. 1 shows left eye and right eye stereoscopic images that when viewed by a user of an electronic device provide 3D virtual content. As shown in FIG. 1, a left eye image 110L and a right eye image 110R each include a plurality of regions having different display qualities. For example, the left eye image 110L and the right eye image 110R can each include a plurality of regions having different resolutions. When the gaze of a user of the electronic device is known, the left eye image 110L and the right eye image 110R may use foveated rendering. A first region or focus region 112L, 112R includes a focus area where the gaze of the user of the electronic device lands or is fixated, which is rendered at a first quality (e.g., high resolution or detail). A second region 114L, 114R is nearby the first region 112 and is rendered at a second quality (e.g., medium resolution) lower than the first quality. A third region 116L, 116R is the remaining portion of the rendered image in the left eye display 110L and the right eye display 110R, respectively, and is rendered at a third quality (e.g., lower resolution) lower than the second quality. For example, the third region 116L, 116R is a background region. The second region 114L, 114R can provide a smooth transition between the focus region 112L, 112R and the third region 116L, 116R. In some implementations, the left eye image 110L and the right eye image 110R have more than three regions.

In some implementations, the size of the focus area is based on the gaze of the user of the electronic device. In some implementations, the size of the focus area is based on an arc/angle covered by the gaze of the user. For example, the arc covered by the gaze can be 20 degrees, or an arc/angle between 5 degrees and 20 degrees. Thus, the focus area can be based on the arc covered by the gaze and a visual distance to the rendered content. In some implementations, the size of the focus area is based on an amount of movement of the gaze of the user (e.g., an increase in movement increases the size). In some implementations, the focus area includes an arbitrary number of pixels (e.g., 800 by 800) of a display device rendered in high resolution. In some implementations, the plurality of regions having different rendering qualities are implemented using a variable rasterization rate (VRR). For example, a VRR map of the rendered image can be used to track or update the VRR.

In some implementations, the focus region 112L, 112R is larger than the focus area because the gaze of the user includes constant very minor movements. Having the focus region 112 larger that the focus area reduces an amount of re-drawing of the focus region 112 for multiple frames of the display device.

In some implementations, the plurality of regions having different respective rendering quality use arbitrary values, resolutions, or scales. Further, the arbitrary different rendering qualities of the plurality of regions can be dynamically changed. For example, the first regions 112L, 112R, the second regions 114L, 114R, and the third regions 116L, 116R can be rendered at 10×, 4×, and 1× quality, respectively. In some implementations, the second regions 114L, 114R and the third regions 116L, 116R are rendered as images or textures.

Figure 2A:
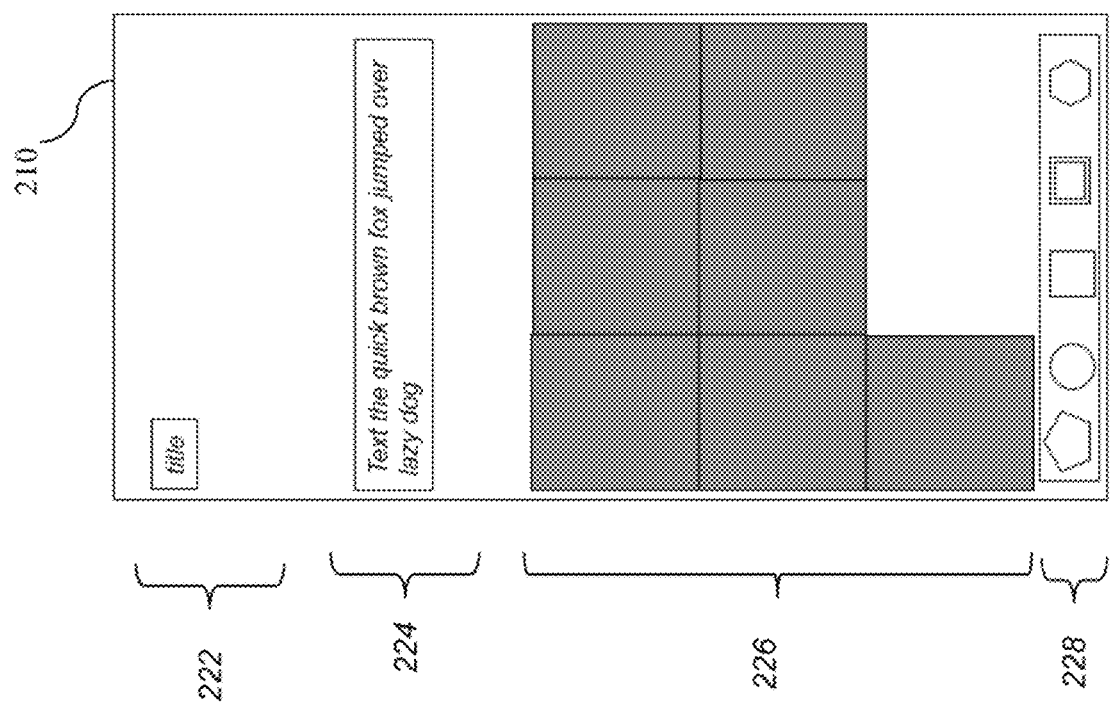
FIGS. 2A-2F illustrate an XR environment displayed using foveated rendering in accordance with some implementations.
Figure 2B:
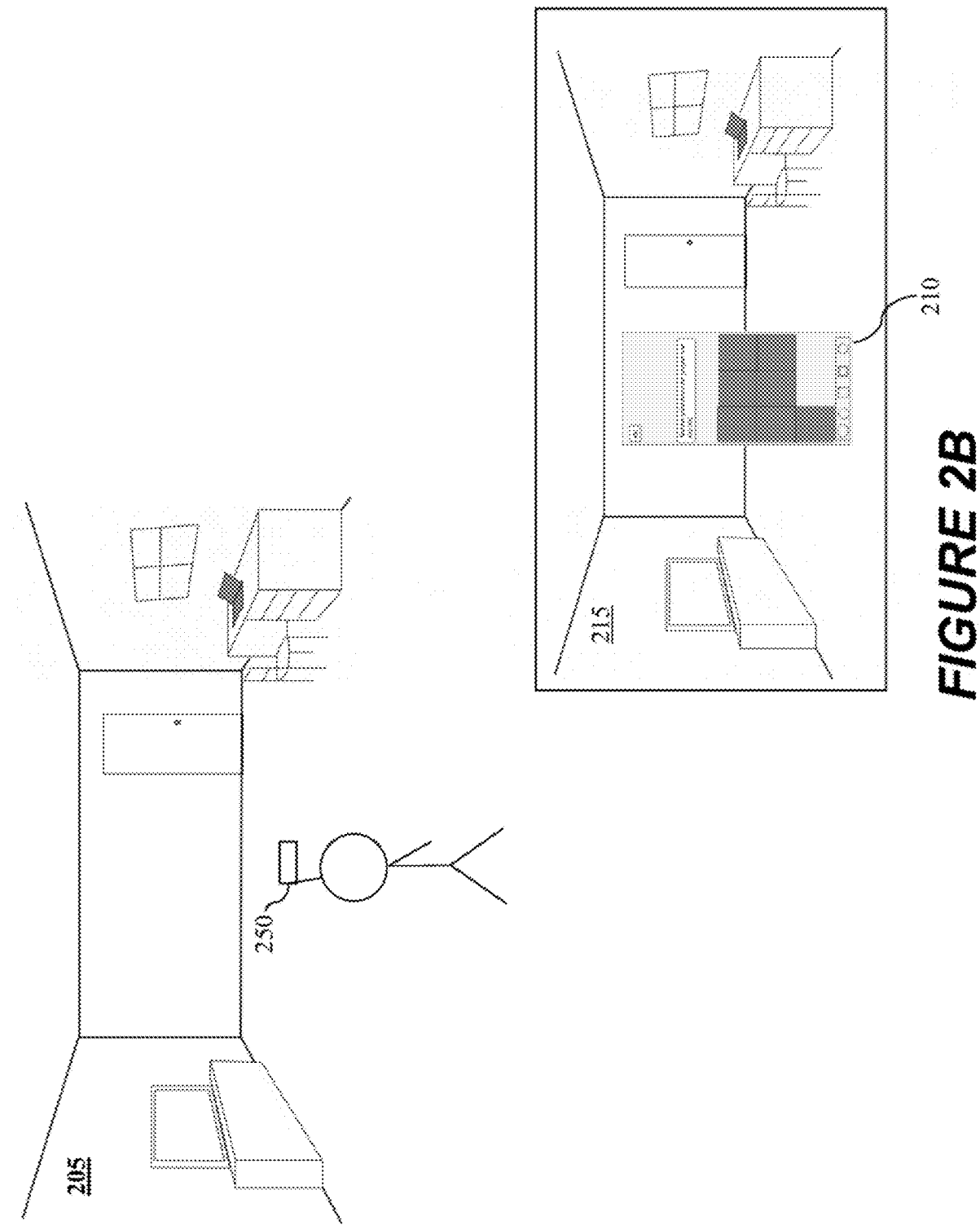

Some implementations disclosed herein provide foveated rendering of content from a source (e.g., a user interface provided by a mobile device application) within another rendering environment (e.g., within a view of an XR environment). For example, the content that would be displayed by an app on the screen of a mobile device may be displayed on a flat virtual surface at a position within a 3D environment. FIGS. 2A-B provide an example of a user interface from a source (e.g., an application on a mobile device) being rendered in another environment. FIGS. 2C-F illustrate how the depiction of the content from the source that is displayed in the other environment can include perspective correct foveated rendering of the content.

FIG. 2A illustrates a user interface of an application. As shown in FIG. 2A, a user interface 210 of an application includes various content. For example, the content on the user interface 210 can include a header section 222, text 224, pictures 226, and icons or links to other content or applications 228.

FIG. 2B illustrates an electronic device 250 within a physical environment 205. The physical environment 205, in this example, is a room or an office within a house. The electronic device 250 is configured to display views (e.g., view 215) of an XR environment that include images of (or are otherwise generated based on images and/or other sensor data of) the physical environment 205. As shown in FIG. 2B, the user interface 210 is displayed in the view 215 of the XR environment. In some implementations, the electronic device 250 is any suitable device for generating and displaying an XR environment such as a smart phone, tablet, or wearable device.

In some implementations, the virtual content (e.g., user interface 210) is displayed relative to a view of the physical environment 205 and thus is displayed based on a defined and potentially fixed position and orientation of a virtual display surface relative to the physical environment. Accordingly, the relative position of the electronic device 250 relative to the display surface may depend upon and thus change based on the location of the electronic device 250 within the physical environment 205. In one position, the view of the electronic device 250 may include a close up and head on view of the virtual display surface while in another position, the view of the electronic device may depict a farther away view of the virtual display surface from an angled perspective. Accordingly, the rendering of the virtual content on the virtual display surface (e.g., how foveated rendering is performed) may depend upon the relative location of the virtual display surface to the electronic device 250. The location of the electronic device 250 may be determined using various techniques, e.g., computer vision-based localization, simultaneous localization and mapping (SLAM), visual inertial odometry (VIO), etc. and may be based on sensor data, e.g., image data, depth data, motion data, audio data, etc.

Figure 2C:
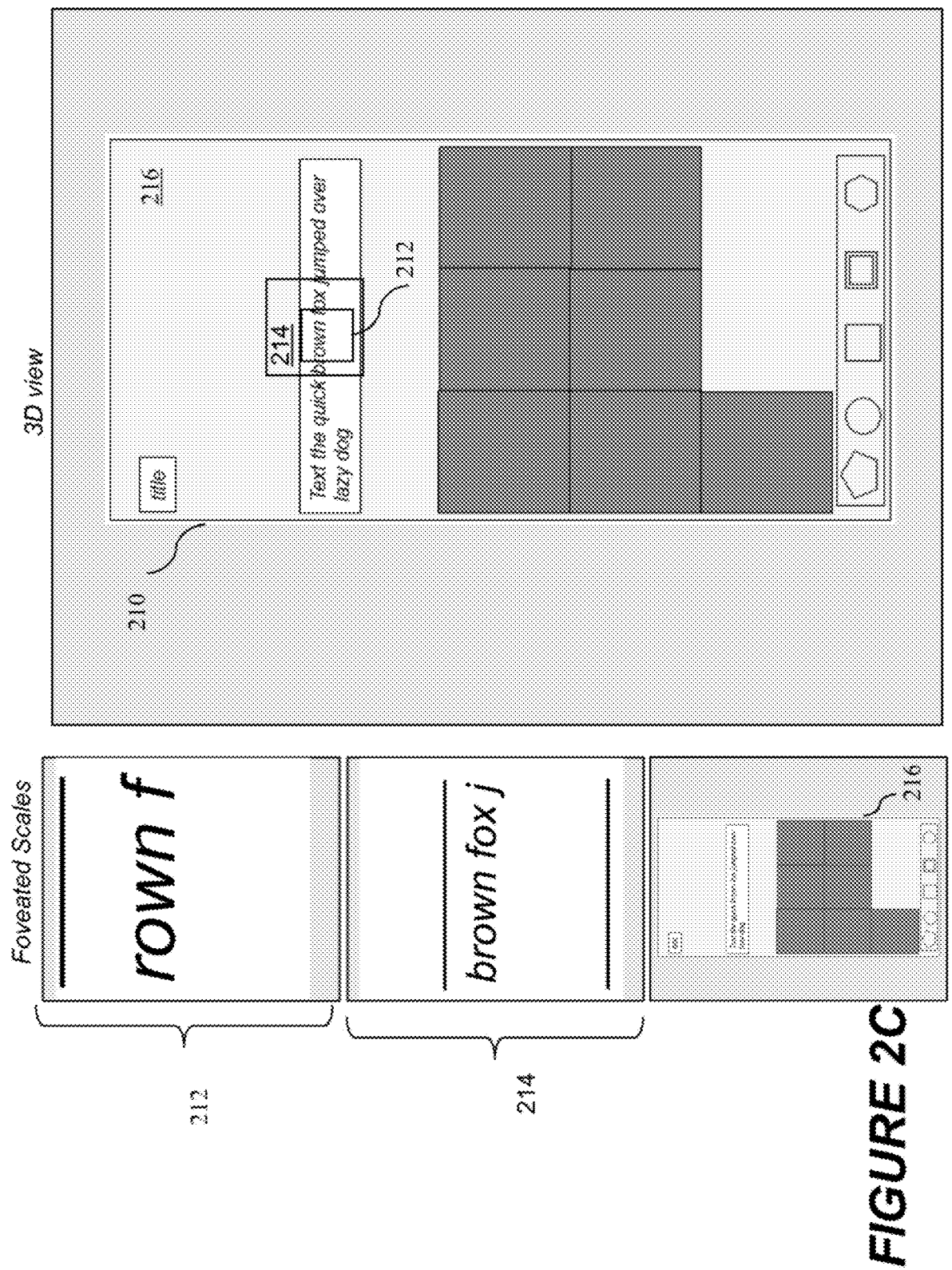

FIG. 2C illustrates foveated rendering of the user interface 210 in a 3D environment. Such rendering may occur, for example, when the virtual display surface is positioned at a relatively close up and head on position relative to the electronic device 250. As shown in FIG. 2C, a focus region 212 is rendered at a first arbitrary foveated scale (e.g., high resolution), a second region 214 surrounding the focus region 212 is rendered at a second arbitrary foveated scale (e.g., medium resolution), and a background region 216 includes the entire user interface 210 and is rendered at a third arbitrary foveated scale (e.g., low resolution). For example, the background region 216 can be a 2D image representing the entire user interface 210. Alternatively, the background region 216 is not rendered at all.

As the gaze of the user of the electronic device 250 is moved around the user interface 210, portions of the user interface 210 are re-rendered at the appropriate scale. Thus, as the focus region 212 and the second region 214 move around the user interface 210 following the gaze of the user of the electronic device 250, portions of the user interface 210 that newly intersect the moving focus region 212 and the moving second region 214 are re-rendered at the appropriate scale. Similarly, portions of the user interface 210 that no longer intersect the moving focus region 212 and the moving second region 214 are re-rendered at the appropriate scale of the background region 216.

In some implementations, the vector graphics are rendered with correct perspective in the focus region 212 because the focus region 212 intersection with the XR environment can be determined in the 3D coordinates of the XR environment. Accordingly, even at extreme angles between the user interface 210 and gaze of the user of the electronic device 250, the vector graphics in the focus region 212 are correctly sampled at the right pixel rate in each dimension. In other words, the gaze of the user is projected into the 3D XR environment to determine an intersection (e.g., the focus region 212) with the user interface 210, which is used to dynamically determine an arbitrary scale that provides sufficiently high rendering resolution for perspective correct vector graphics in the 3D XR environment (e.g., in the focus region 112). In some implementations, 3D and other special visual effects can be applied to the foveated rendering of vector graphics in the user interface 210.

Figure 2D:
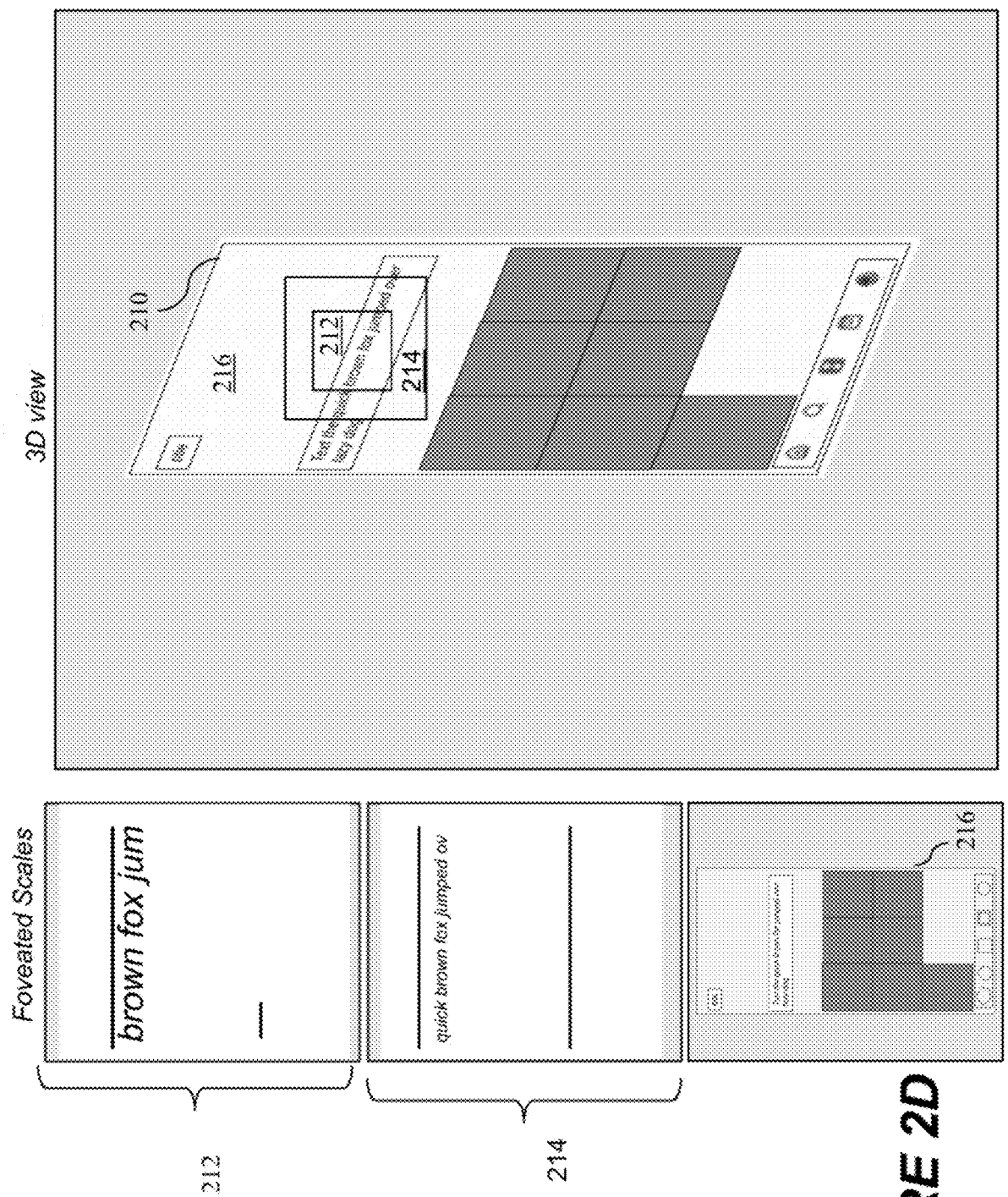
Figure 2E:
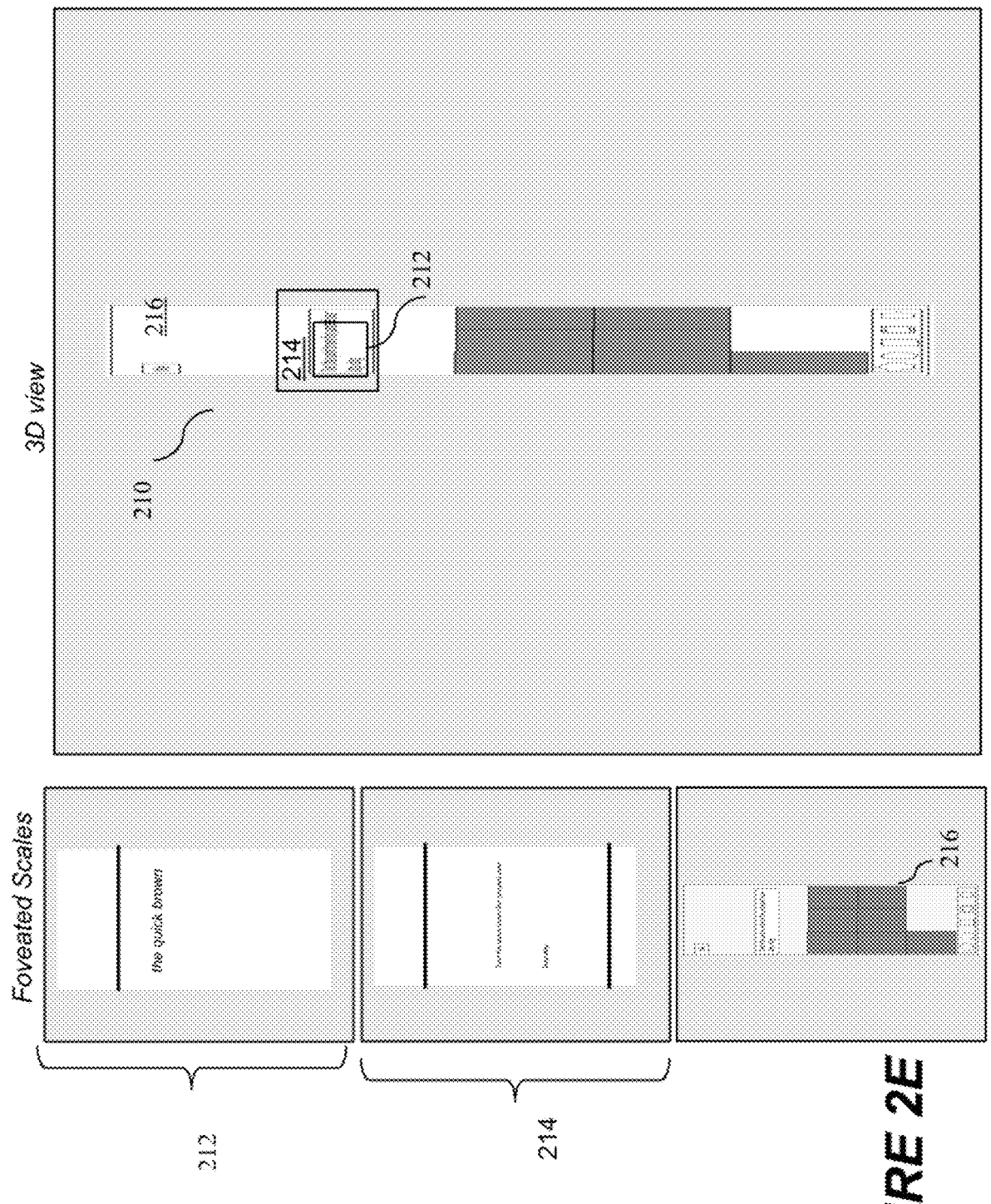
Figure 2F:
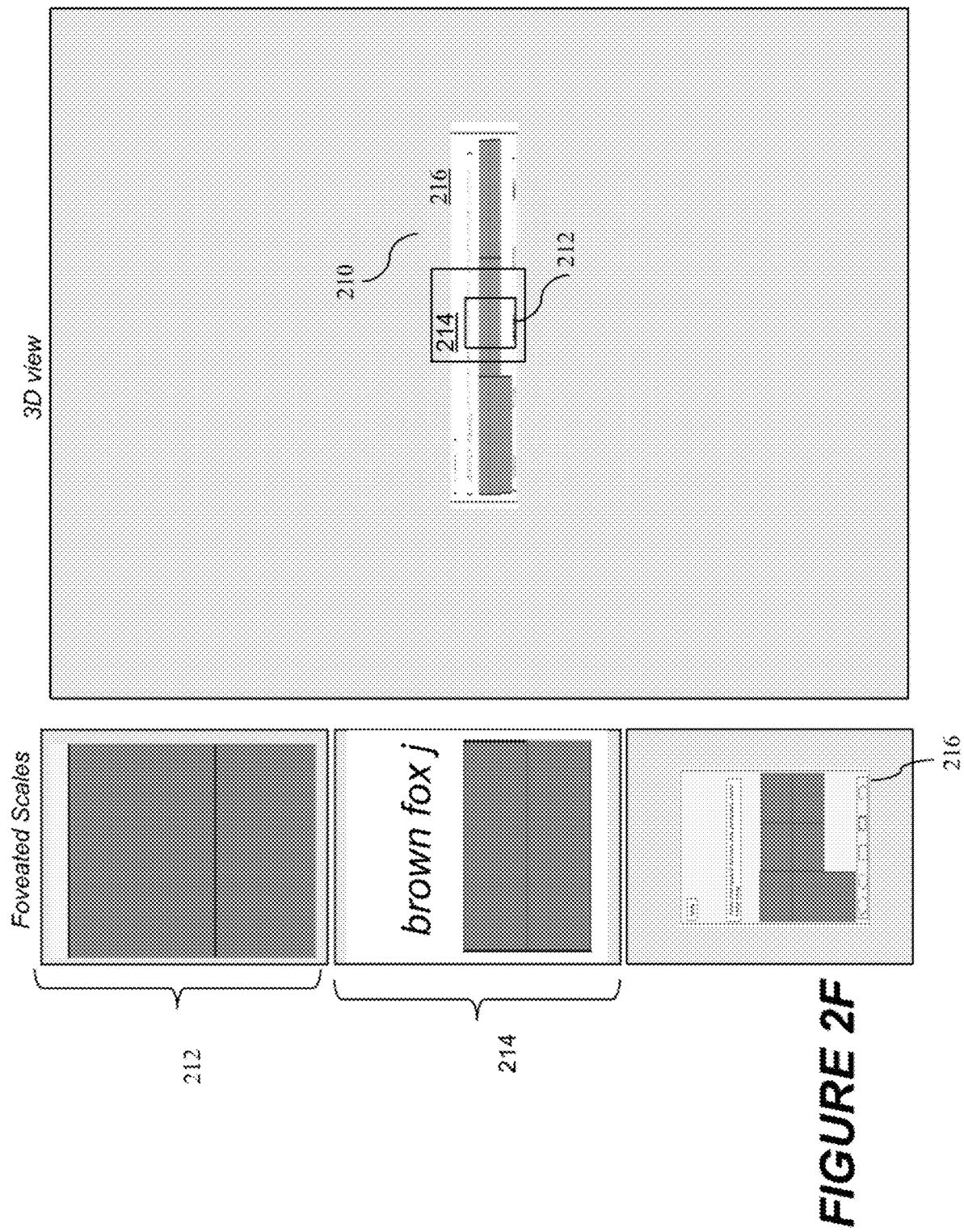

As shown in FIG. 2D, the foveated rendered user interface 210 is rotated about the x-axis and the y-axis. Such rendering may occur, for example, when the virtual display surface is positioned at a relatively close up and at an angled orientation relative to the electronic device 250. In FIG. 2E, the user interface 210 is rotated horizontally 80 degrees. Such rendering may occur, for example, when the virtual display surface is positioned at a relatively close up and at an angled orientation relative to the electronic device 250. As shown in FIG. 2E, the focus region 212 (e.g., gaze or the arc covered by the gaze) intersects more than half of the entire width of the user interface 210. In FIG. 2F, the user interface 210 is close up and rotated 85 degrees around the vertical axis relative to the electronic device 250. As shown in FIG. 2F, the focus region 212 (e.g., gaze or the arc covered by the gaze) intersects vertically more than half of the user interface 210 (e.g., top to bottom).

Figure 3:
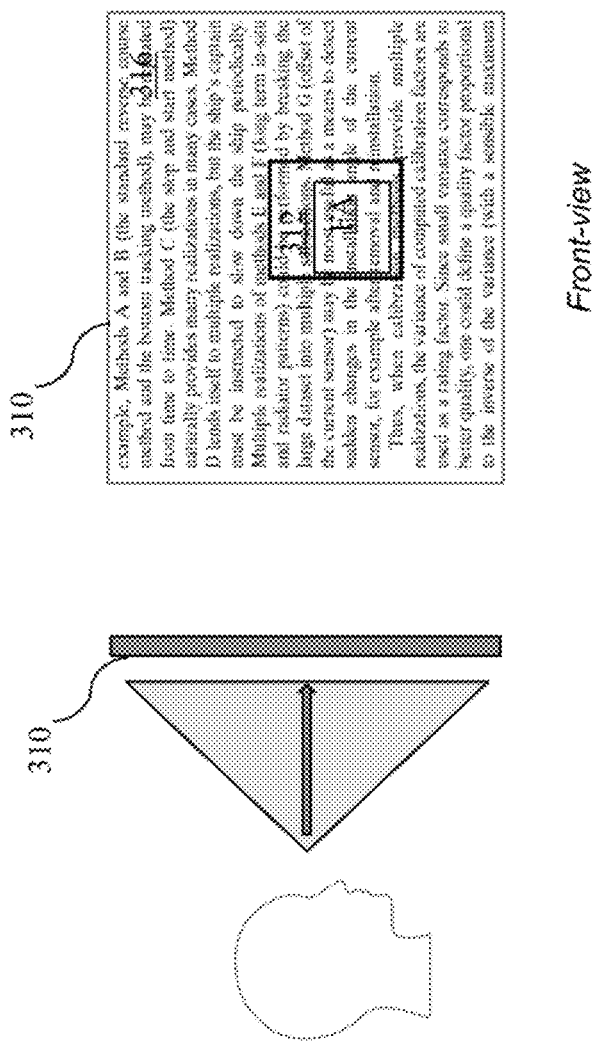
FIGS. 3-4 illustrate a layer view of virtual content displayed using foveated rendering in accordance with some implementations.

FIG. 3 shows an orientation and a front view of an exemplary vector graphic displayed in a user interface of an application using foveated rendering. As shown in FIG. 3, the vector graphic is content 310 (e.g., a PDF of text) that encompasses a user interface and includes a first focus region 312 and a background region 316. Thus, two rendering layers are used for the foveated rendering of the content 310. Again, a gaze direction and therefore a focus area (FA) of a viewer of the content 310 is smaller than the focus region 312. In some implementations, the focus region 312 may be a small section of the content 310. For example, when reading, most people read a few words at a time in a single row of text, and therefore, the focus region 312 may include four or five words on that single row of text or include a row above and/or below that single row.

In some implementations, the content 310 is divided into a plurality of groups of pixels. In some implementations, the content 310 is divided into a plurality of pixels called tiles that each have the same shape. In some implementations the content 310 is divided into a plurality of tiles that have the same shape and size.

Figure 4:
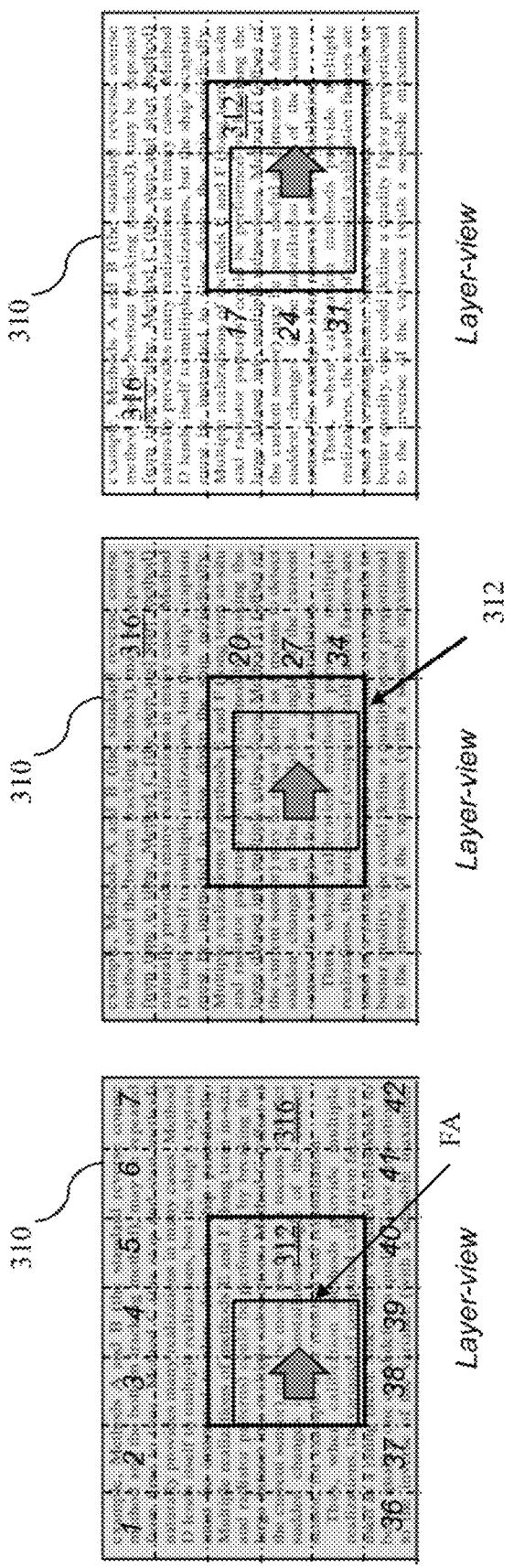

FIG. 4 shows a layer view of a multiple instances over time of an exemplary vector graphic displayed using foveated rendering. As shown in FIG. 4, the content 310 (e.g., a PDF of text) is divided into a plurality of tiles (e.g., 42 tiles) drawn in dashed lines that each include a plurality of pixels used to render the content 310. As shown in FIG. 4, the focus region 312 includes 9 of the tiles and the background region 316 includes 33 of the tiles.

FIG. 4 shows that as the gaze of the user moves to the right while reading the text in the PDF that forms the content 310, the focus region 312 including the FA will move to follow the gaze of the user. In one implementation, just as (or just before) the focus area or focus region 312 crosses into the tiles 20, 27 or 34, those tiles are added to the focus region 312 (e.g., re-rendered at the scale of the focus region 312) and tiles 17, 24, and 31 are dropped from the focus region 312 (e.g., re-rendered at the scale of the background regions 316). In FIG. 4, the direction of the movement of the focus region 312 is left to right however, the direction of movement could be right to left, top to bottom, or jump from one section of content to another.

Thus, in some implementations the text or other vector graphics can be divided into layers (e.g., 2 layers in FIGS. 3-4), and only in the focus region 312 is the text or other vector graphics rendered using perspective correct vector graphics. The regions (e.g., vector graphics) outside the focus region 312 are not relevant or are rendered using techniques that reduce the amount of computation or memory used for the rendering.

Various implementations disclosed herein include devices, systems, and methods the perform a rendering process that performs foveated text rendering using content received from a source (e.g., a mobile device app). For example, the content that would be displayed by an app on the screen of a mobile device may be displayed using a flat virtual surface at a position within a 3D environment. Rather than receiving a bitmap from the source (e.g., the mobile device app), the rendering process uses vector drawing commands that define the content from the source to render the content. Moreover, such vector drawing commands may be used to provide foveated rendering of the content from the source. In some implementations, the source is an application that provides content using API calls to API procedures of a drawing engine. The rendering process can be configured to render such content from a source without requiring that the source (e.g., mobile device app) be changed, for example, by instead changing the drawing engine API procedures.

When receiving the bitmap from these source (e.g., the mobile device app), the rendering process cannot render perspective correct content because the drawing commands are not available to the rendering process. In this example, the bitmap received from the source is a fixed resolution and the rendering process (e.g., using the virtual surface in the 3D environment) cannot provide perspective correct content, for example, when zooming-in or zooming-out (e.g., magnification) using the fixed resolution bitmap.

Accordingly, the corresponding vector graphics drawing commands are needed by the rendering process to render perspective correct complex vector graphics such as text received from a source (e.g., a mobile device app) in the 3D environment. In some implementations, the rendering process receives the vector graphic drawing commands from the source (e.g., mobile device app) and renders all vector graphics itself using the virtual surface in the 3D environment (e.g., the source does no rendering). In some implementations, the perspective correct vector graphics rendering process modifies the API procedures called by the source to receive vector graphic drawing commands from the source. Accordingly, since the same API (e.g., call to a library) is called there is no change needed to the source (e.g., mobile device app). Thus, in some implementations, the rendering process changes what the source sends (via the API call) with the vector graphic rendering request without changing the source itself. Accordingly, the rendering process now renders all vector graphics to render the content received from the source and can dynamically change the quality/resolution of the vector graphics. Further, the rendering process can scale the vector graphics for foveated rendering at the appropriate times. In some implementations, the rendering process itself can use drawing engines such as subdivision techniques (e.g., see FIG. 4), CPU-based rendering, raster graphics, etc.

In some implementations, vector graphic rendering techniques described herein provide foveated rendering with perspective correct vector graphic rendering only in a focus region. The perspective correct vector graphic rendering is provided using a dynamically changing orientation, size, and/or rendered quality in the focus region. Accordingly, the perspective correct vector graphic rendering is only provided where needed (e.g., focus region, 9 tiles in FIG. 4). Further, the perspective correct vector graphics rendering process receive all vector graphic drawing commands for the XR environment. Thus, the focus region can be provided with an arbitrary scale because all vector graphic rendering is done by the rendering process (e.g., compositing server). In addition, the perspective correct vector graphics rendering process is compatible with applications executing on existing electronic devices such as smart phones, tablets, watches, or desktops. In some implementations, vector graphic rendering techniques described herein provide foveated rendering with perspective correct vector graphic rendering using layer hierarchies (e.g., a plurality of regions including the focus region), which lowers the amount of computation and memory used for the rendering.

Vector graphics include paths, which are defined by a start and end point, along with other points, curves, and angles along the way. In some implementations, vector graphics are defined based on vector graphics drawing commands that define one or more paths (e.g., lines, curves, or shapes specified by math formulas) and/or that specify the vector graphics' material visual properties (e.g., color, texture, etc.). Vector graphics can be used to define the appearances of various things including, but not limited to, text strings, PDFs files, fonts, 2D graphics, virtual objects, emojis, etc.

In some implementations, a 2D canvas is a part of a 2D plane, and the canvas includes all the drawing content for the vector graphic. In some implementations, the 2D canvas can be warped in 3D (e.g., reflection, distortion, mirroring) to provide 3D effects for the displayed vector graphic in a 3D environment.

In one implementation, subdivision techniques (e.g., pre-processing) are used for the foveated rendering of perspective correct vector graphics. The subdivision techniques may be used to reduce number of computations required to render the graphics and/or to reduce the number of curves used to represent the 2D vector graphic. The subdivision techniques may enable rendering vector graphics in real time (e.g., every frame) in a 3D environment. In some implementations, the subdivision techniques (e.g., pre-processing) are performed in a first processor (e.g., CPU) and the 2D canvas is rendered by a second processor (e.g., GPU) of one or more electronic devices. In some implementations, the subdivision technique divides the canvas into a plurality of regions of pixels (e.g., see FIG. 4). In some implementations, the subdivision technique divides the canvas into a plurality of uniformly shaped tiles of pixels. In one example, the tiles are all of the same size. Thus, each tile is a portion of the canvas.

The subdivision technique (e.g., pre-processing) operates to determine a list of relevant drawing commands (e.g., only the drawing commands for paths that contribute to each tile and then only the portions of the paths that crossed the tile). In some implementations, the subdivision technique transmits a data structure that is a series of drawing commands to a processor (e.g., GPU) to render the canvas in a 3D environment.

In some implementations, a GPU shader renders the vector graphic by processing the transmitted data structure. In some implementations, the GPU shader renders pixels forming the vector graphic by determining (i) what tile contained a pixel, (ii) what drawing commands (e.g., paths) are relevant to this tile, and then determine coverage (e.g., a percentage of the pixel (that has a specific color or material property), color, and composition (e.g., blending partially covered pixels or visual effects of rendered pixels) for the current pixel. Then, the GPU shader repeats the process for the remaining pixels that form the vector graphic.

In some implementations, the canvas (e.g., vector graphics) is rendered for each frame displayed in a 3D environment. However, the subdivision techniques are performed only when the content of the canvas is changed. In other words, the subdivision techniques are processed only once for each non-mutated canvas. For example, for a fixed PDF vector graphic, the subdivision techniques are performed only once for the same document, but the PDF vector graphic can be re-rendered in every frame of the 3D environment. In some implementations, only the relevant pixels in the canvas are rendered with each frame. For example, only the pixels in the canvas that change are updated. In some implementations, the pixels that change in the canvas are identified by comparing the canvas for the next frame with the canvas for the current frame.

Figure 5:
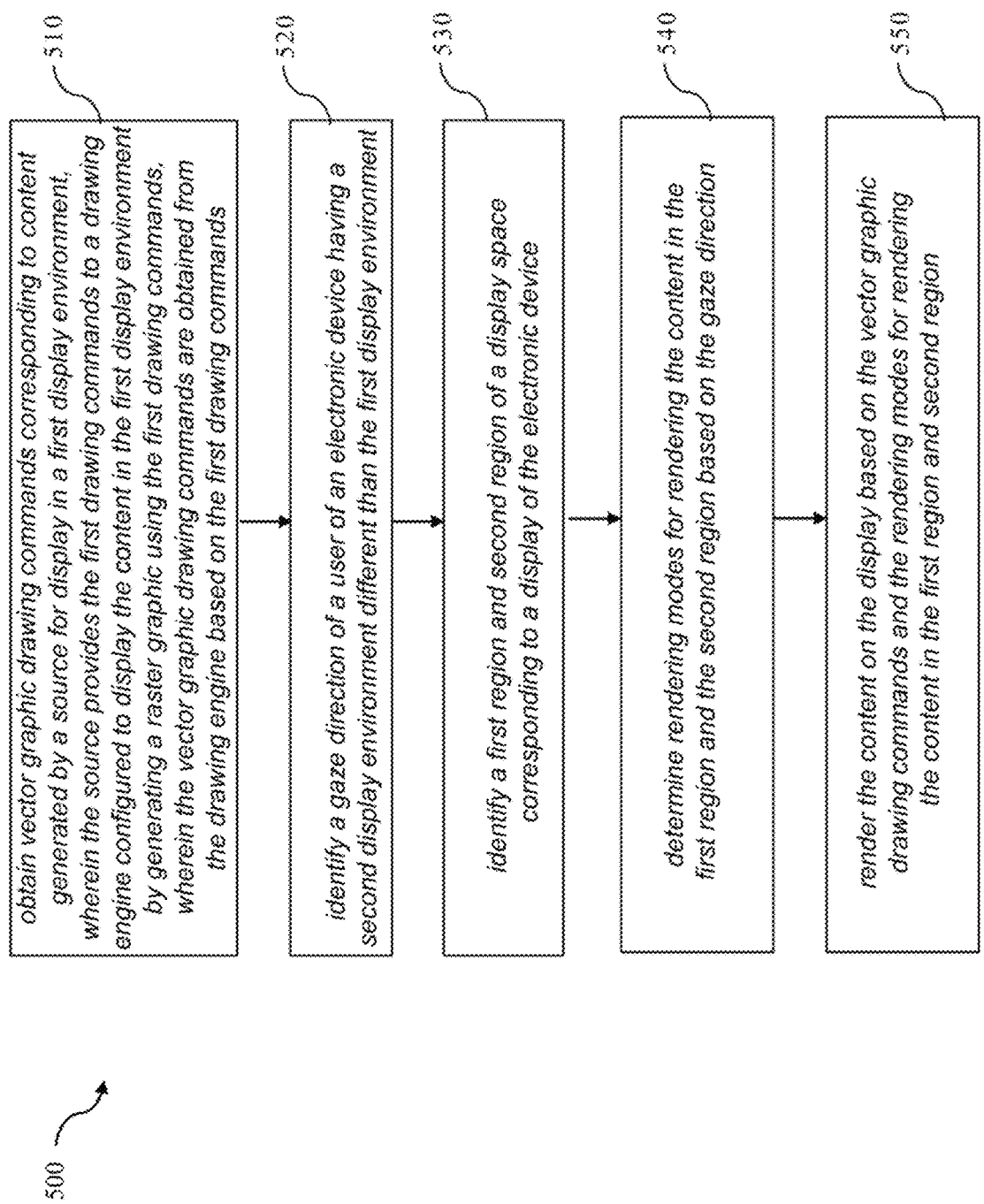
FIG. 5 is a flowchart illustrating an exemplary rendering method that variously performs vector graphics rendering using content received from a source application in accordance with some implementations.

FIG. 5 is a flowchart illustrating an exemplary method for a rendering process that performs vector graphics rendering using content received from a source (e.g., an application). In some implementations, a 3D environment is provided with a view that includes the foveated vector graphics and other content (e.g., XR environment or physical environment). For example, the source may be an application that includes API calls to a drawing engine (e.g., drawing library). In some implementations, the display of content from the source can be changed by changing the drawing library API procedures, which removes the need to change the source application itself. For example, rather than receiving a bitmap from the source for a text vector graphic (e.g., "hello world"), the rendering process uses vector graphic drawing commands from the source to be able to provide foveated vector graphic rendering for the text vector graphic. The foveated rendering process can draw perspective correct vector graphics in selected regions based on gaze (e.g., focus region at higher resolution/higher frame rate, etc.) In some implementations, the method 500 is performed by a device (e.g., electronic device 700 of FIG. 7). The method 500 can be performed using an electronic device or by multiple devices in communication with one another. In some implementations, the method 500 is performed by processing logic, including hardware, firmware, software, or a combination thereof. In some implementations, the method 500 is performed by a processor executing code stored in a non-transitory computer-readable medium (e.g., a memory). In some implementations, the method 500 is performed by an electronic device having a processor.

At block 510, the method 500 obtains vector graphic drawing commands corresponding to content generated by a source for display in a first display environment, wherein the source provides the first drawing commands to a drawing engine configured to display the content in the first display environment by generating a raster graphic (e.g., bitmap) using the first drawing commands, wherein the vector graphic drawing commands are obtained from the drawing engine based on the first drawing commands. For example, the source is an application running on a smartphone that generates a view of content including text for display in the first display environment that is a display on the smartphone. The source/application provides the first drawing commands (e.g., via API calls) to a drawing engine configured to display the content in the first display environment by generating a raster graphic (e.g., bitmap) for the text using the first drawing commands. However, an updated drawing engine may alternatively obtain the vector graphic drawing commands for the text based on the first drawing commands. For example, an API call to an updated drawing engine (e.g., API procedures, compositing server) does not change the source/application making the API call, but can be configured to use the vector graphic drawing commands to render the text as a vector graphic instead of a raster graphic. For example, the updated drawing engine may obtain a display list or container of drawing commands from the source based on the content (e.g., for the text) to be displayed on in a second display environment.

At block 520, the method 500 identifies a gaze direction of a user of an electronic device having a second display environment different than the first display environment. In some implementations, the gaze direction is determined using active or passive eye tracking (e.g., illumination) of the user of the electronic device. The gaze direction can be compared to the content generated by the source/application.

At block 530, the method 500 identifies a first region and second region of a display space corresponding to a display of the electronic device. In some implementations, the first region and the second region are based on the gaze direction of the user of the electronic device. For example, the first region may intersect the gaze direction and the second region does not intersect the gaze direction. In some implementations, the first region is a focus region and the second region is a background region. In some implementations, a size of the first region is based on an angle of foveation and a distance to the content. In one example, the display of the electronic device is divided into a plurality of tiles and the first region is a first subset of tiles based on the gaze direction and the second region is the remaining tiles.

At block 540, the method 500 determines rendering modes for rendering the content in the first region and the second region based on the gaze direction. In one implementation, the rendering mode for the first region is a perspective correct vector graphics rendering mode and the rendering mode for the second region is a 2D image or texture. Alternatively, the rendering mode for the first region is an 8× visual quality and the rendering mode for the second region is a 1× visual quality. In one example, the content in the first region is rendered at a display frame rate. In one example, the content in the second region is rendered once or upon change. For example, a tablet or HMD can compare a view of current content for the application with the first region and the second region.

At block 550, the method 500 renders the content on the display based on the vector graphic drawing commands and the rendering modes for rendering the content in the first region and second region. In some implementations, blocks 510-550 are repeatedly performed. In some implementations, the techniques disclosed herein may be implemented on a smart phone, tablet, or a wearable device, such as a head-mounted device (HMD) having an optical see-through or opaque display.

Figure 6:
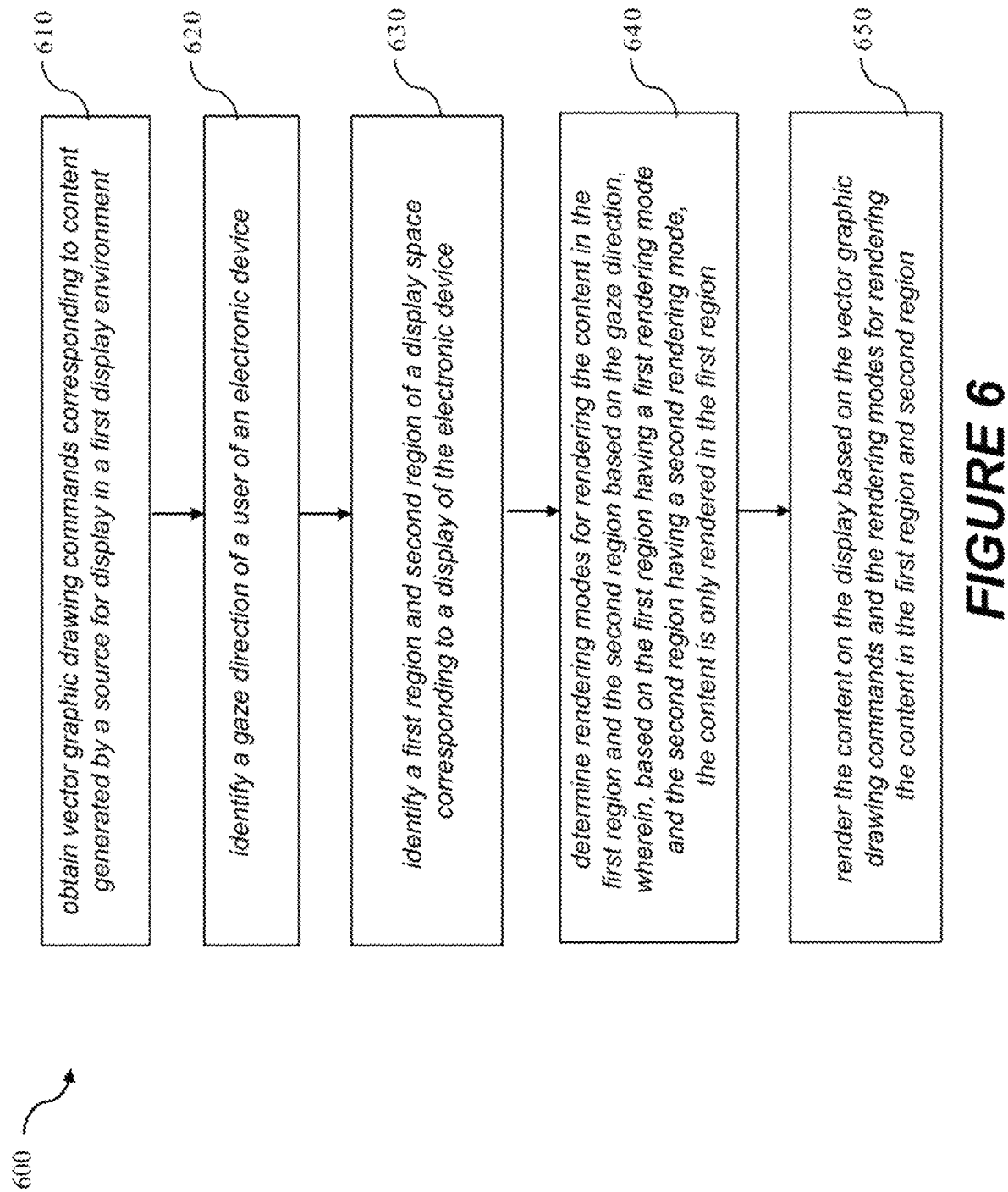
FIG. 6 is a flowchart illustrating an exemplary method of foveated rendering using content received from a source application by selectively drawing the content for only some regions based on gaze in accordance with some implementations.

FIG. 6 is a flowchart illustrating an exemplary method of foveated rendering using content received from a source by selectively rendering the content for only some regions based on a gaze direction. In some implementations, content is not drawn outside a focus region of a user of an electronic device. In some implementations, perspective correct vector graphics are re-drawn at a frame rate of a display device in the focus region. In some implementations, content is re-drawn only in the focus region. In one example, the source is an application running on an electronic device. In some implementations, the method 600 is performed by a device (e.g., electronic device 700 of FIG. 7). The method 600 can be performed using an electronic device or by multiple devices in communication with one another. In some implementations, the method 600 is performed by processing logic, including hardware, firmware, software, or a combination thereof. In some implementations, the method 600 is performed by a processor executing code stored in a non-transitory computer-readable medium (e.g., a memory). In some implementations, the method 600 is performed by an electronic device having a processor.

At block 610, the method 600 obtains vector graphic drawing commands corresponding to content generated by a source for display in a first display environment. In some implementations, the source is a client/mobile device application. For example, the source could be an application running on a source electronic device (e.g., smartphone or tablet device) that generates a view including text and/or other virtual content (e.g., a user interface) for viewing.

At block 620, the method 600 identifies a gaze direction of a user of an electronic device. In some implementations, the gaze direction of the user is determined using passive or active eye tracking functionality at the electronic device. For example, the electronic device can be an HMD that will display a view of a mobile device app's user interface based on information generated by the current application providing the mobile device app's displayable content.

At block 630, the method 600 identifies a first region and second region of a display space corresponding to a display of the electronic device. In some implementations, the first region is a focus region of the display and the second region is a background region. In some implementations, the first region is a first subset of a plurality of regions (e.g., groups of pixels) and the second region is a second different subset of the plurality of regions outside (e.g., adjacent or surrounding) the first subset of pixels. For example, the groups of pixels can be the same shape and size (each group of pixels is a rectangular tile in the display space).

At block 640, the method 600 determines rendering modes (e.g., rendered or not rendered) for rendering the content in the first region and the second region based on the gaze direction, wherein, based on the first region having a first rendering mode and the second region having a second rendering mode, the content is only rendered in the first region. In some implementations, the content is not rendered by the second rendering mode in the second region.

At block 650, the method 600 renders the content on the display based on the vector graphic drawing commands and the rendering modes for rendering the content in the first region and second region. In some implementations, the first rendering mode only renders the content in a focus region that is the first region. In some implementations, the first rendering mode renders the content at a first resolution in the first region and a second rendering mode renders the content at a second reduced resolution in the second region. In some implementations, rendering in the first region is performed at a first frame rate and rendering in the second region is at a second frame rate less than the first frame rate. For example, content in the second region is rendered once or upon change by the second rendering process.

In some implementations, blocks 610-650 are repeatedly performed. In some implementations, the techniques disclosed herein may be implemented on a smart phone, tablet, or a wearable device, such as an HMD having an optical see-through or opaque display.

A physical environment refers to a physical world that people can interact with and/or sense without the aid of electronic systems. A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

In some implementations, the electronic device presenting the XR environment is a single device that may be hand-held (e.g., mobile phone, a tablet, a laptop, etc.) or worn (e.g., a watch, a head-mounted device (HMD), etc.). In some implementations, functions of the electronic device are accomplished via two or more communicating (e.g., wired or wireless) devices, for example additionally including an optional base station. Other examples include a laptop, desktop, server, or other such device that includes additional capabilities in terms of power, CPU capabilities, GPU capabilities, storage capabilities, memory capabilities, and the like.

FIG. 7 is a block diagram of an example device 700. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 700 includes one or more processing units 702 (e.g., microprocessors, ASICs, FPGAs, GPUs, CPUs, processing cores, or the like), one or more input/output (I/O) devices and sensors 706, one or more communication interfaces 708 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 710, one or more displays 712, one or more interior or exterior facing sensor systems 714, a memory 720, and one or more communication buses 704 for interconnecting these and various other components.

In some implementations, the one or more communication buses 704 include circuitry that interconnects and controls communications between system components. In some implementations, the one or more I/O devices and sensors 706 include at least one of an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like.

In some implementations, the one or more displays 712 are configured to present content to the user. In some implementations, the one or more displays 712 correspond to holographic, digital light processing (DLP), liquid-crystal display (LCD), liquid-crystal on silicon object (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 712 correspond to diffractive, reflective, polarized, holographic, etc. waveguide displays. For example, the electronic device 700 may include a single display. In another example, the electronic device 700 includes a display for each eye of the user.

In some implementations, the one or more interior or exterior facing sensor systems 714 include an image capture device or array that captures image data or an audio capture device or array (e.g., microphone) that captures audio data. The one or more image sensor systems 714 may include one or more RGB cameras (e.g., with a complimentary metal-oxide-semiconductor (CMOS) image sensor or a charge-coupled device (CCD) image sensor), monochrome cameras, IR cameras, or the like. In various implementations, the one or more image sensor systems 714 further include an illumination source that emits light such as a flash. In some implementations, the one or more image sensor systems 714 further include an on-camera image signal processor (ISP) configured to execute a plurality of processing operations on the image data.

The memory 720 includes high-speed random-access memory, such as DRAM, SRAM, DDR RAM, or other random-access solid-state memory devices. In some implementations, the memory 720 includes non-volatile memory, such as one or more magnetic disk storage devices, optical disk storage devices, flash memory devices, or other non-volatile solid-state storage devices. The memory 720 optionally includes one or more storage devices remotely located from the one or more processing units 702. The memory 720 comprises a non-transitory computer readable storage medium.

In some implementations, the memory 720 or the non-transitory computer readable storage medium of the memory 720 stores an optional operating system 730 and one or more instruction set(s) 740. The operating system 730 includes procedures for handling various basic system services and for performing hardware dependent tasks. In some implementations, the instruction set(s) 740 include executable software defined by binary information stored in the form of electrical charge. In some implementations, the instruction set(s) 740 are software that is executable by the one or more processing units 702 to carry out one or more of the techniques described herein.

In some implementations, the instruction set(s) 740 include a vector graphics generator 742 that is executable by the processing unit(s) 702 to foveated perspective correct vector graphic rendering (e.g., a focus region) according to one or more of the techniques disclosed herein.

Although the instruction set(s) 740 are shown as residing on a single device, it should be understood that in other implementations, any combination of the elements may be located in separate computing devices. FIG. 7 is intended more as a functional description of the various features which are present in a particular implementation as opposed to a structural schematic of the implementations described herein. As recognized by those of ordinary skill in the art, items shown separately could be combined and some items could be separated. For example, actual number of instruction sets and the division of particular functions and how features are allocated among them will vary from one implementation to another and, in some implementations, depends in part on the particular combination of hardware, software, or firmware chosen for a particular implementation.

It will be appreciated that the implementations described above are cited by way of example, and that the present invention is not limited to what has been particularly shown and described hereinabove. Rather, the scope includes both combinations and sub combinations of the various features described hereinabove, as well as variations and modifications thereof which would occur to persons skilled in the art upon reading the foregoing description and which are not disclosed in the prior art.

Those of ordinary skill in the art will appreciate that well-known systems, methods, components, devices, and circuits have not been described in exhaustive detail so as not to obscure more pertinent aspects of the example implementations described herein. Moreover, other effective aspects and/or variants do not include all of the specific details described herein. Thus, several details are described in order to provide a thorough understanding of the example aspects as shown in the drawings. Moreover, the drawings merely show some example embodiments of the present disclosure and are therefore not to be considered limiting.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively, or additionally, the program instructions can be encoded on an artificially generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, and/or broken into sub-blocks. Certain blocks or processes can be performed in parallel. The operations described in this specification can be implemented as operations performed by a data processing apparatus on data stored on one or more computer-readable storage devices or received from other sources.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
   at a processor of an electronic device:
   obtaining vector graphic drawing commands corresponding to first content generated by a source for display in a first display environment, wherein the source provides first drawing commands to a drawing engine configured to display first content in the first display environment, wherein the vector graphic drawing commands are obtained from the drawing engine based on the first drawing commands;
   identifying a gaze direction of a user of the electronic device having a second display environment different than the first display environment;
   identifying a first region and a second region of a plurality of regions having different resolutions of a display space corresponding to a display of the electronic device;
   determining rendering modes for rendering second content based on the first content generated by the source, wherein the second content is rendered in the first region and the second region based on the gaze direction; and
   rendering the second content on the display based on the vector graphic drawing commands and the rendering modes for rendering the second content in the first region and the second region, wherein at least a portion of the second content is rendered at a different resolution level than the first content generated by the source.

2. The method of claim 1, wherein the second content is XR content including text.

3. The method of claim 1, wherein the electronic device is a first electronic device, the source is an application executing on the first electronic device, and the first display environment is a display at the first electronic device.

4. The method of claim 1, wherein the source provides a raster graphic via API calls to the drawing engine to display the rendered second content in the first display environment, and wherein the raster graphic is a bitmap.

5. The method of claim 1, wherein the vector graphic drawing commands are generated from a list of drawing commands obtained by the drawing engine in the second display environment via API calls by the source.

6. The method of claim 5, wherein the electronic device is a first electronic device, and the source is an application executing on a second electronic device different than the first electronic device.

7. The method of claim 1, wherein the first region is a focus region based on the gaze direction region and the second region is a background region.

8. The method of claim 1, wherein a first rendering mode in the first region is a foveated perspective correct rendering mode based on the vector graphic drawing commands.

9. The method of claim 1, wherein a first rendering mode in the first region is a first variable resolution rendering mode and a second rendering mode in the second region is a second fixed resolution rendering mode, wherein the second fixed resolution is always less than the first variable resolution.

10. The method of claim 1, wherein rendering in the first region is performed at a frame rate of the display and rendering in the second region is at a second frame rate less than the frame rate of the display or upon change.

11. A system comprising:
    memory; and
    one or more processors at an electronic device coupled to the memory, wherein the memory comprises program instructions that, when executed on the one or more processors, cause the system to perform operations comprising:
    obtaining vector graphic drawing commands corresponding to first content generated by a source for display in a first display environment, wherein the source provides first drawing commands to a drawing engine configured to display first content in the first display environment, wherein the vector graphic drawing commands are obtained from the drawing engine based on the first drawing commands;
    identifying a gaze direction of a user of the electronic device having a second display environment different than the first display environment;
    identifying a first region and a second region of a plurality of regions having different resolutions of a display space corresponding to a display of the electronic device;
    determining rendering modes for rendering second content based on the first content generated by the source, wherein the second content is rendered in the first region and the second region based on the gaze direction; and
    rendering the second content on the display based on the vector graphic drawing commands and the rendering modes for rendering the second content in the first region and the second region, wherein at least a portion of the second content is rendered at a different resolution level than the first content generated by the source.

12. The system of claim 11, wherein the second content is XR content including text.

13. The system of claim 11, wherein the electronic device is a first electronic device, the source is an application executing on the first electronic device, and the first display environment is a display at the first electronic device.

14. The system of claim 11, wherein the source provides a raster graphic via API calls to the drawing engine to display the rendered second content in the first display environment, and wherein the raster graphic is a bitmap.

15. The system of claim 11, wherein the vector graphic drawing commands are generated from a list of drawing commands obtained by the drawing engine in the second display environment via API calls by the source.

16. The system of claim 15, wherein the electronic device is a first electronic device, and the source is an application executing on a second electronic device different than the first electronic device.

17. The system of claim 11, wherein the first region is a focus region based on the gaze direction region and the second region is a background region.

18. The system of claim 11, wherein a first rendering mode in the first region is a foveated perspective correct rendering mode based on the vector graphic drawing commands.

19. The system of claim 11, wherein a first rendering mode in the first region is a first variable resolution rendering mode and a second rendering mode in the second region is a second fixed resolution rendering mode, wherein the second fixed resolution is always less than the first variable resolution.

20. A non-transitory computer-readable storage medium, storing program instructions executable via one or more processors of an electronic device to perform operations comprising:
   obtaining vector graphic drawing commands corresponding to first content generated by a source for display in a first display environment, wherein the source provides first drawing commands to a drawing engine configured to display first content in the first display environment, wherein the vector graphic drawing commands are obtained from the drawing engine based on the first drawing commands;
   identifying a gaze direction of a user of the electronic device having a second display environment different than the first display environment;
   identifying a first region and a second region of a plurality of regions having different resolutions of a display space corresponding to a display of the electronic device;
   determining rendering modes for rendering second content based on the first content generated by the source, wherein the second content is rendered in the first region and the second region based on the gaze direction; and
   rendering the second content on the display based on the vector graphic drawing commands and the rendering modes for rendering the second content in the first region and the second region, wherein at least a portion of the second content is rendered at a different resolution level than the first content generated by the source.

* * * * *